(12) United States Patent
Eberlein et al.

(10) Patent No.: US 12,541,498 B2
(45) Date of Patent: Feb. 3, 2026

(54) ORGANIZATIONAL PROCESS BACKGROUND INTELLIGENCE

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/660,818

(22) Filed: May 10, 2024

(65) Prior Publication Data

US 2025/0348475 A1  Nov. 13, 2025

(51) Int. Cl.
  *G06F 16/00* (2019.01)
  *G06F 16/21* (2019.01)
  *G06F 16/23* (2019.01)
  *G06F 16/25* (2019.01)

(52) U.S. Cl.
  CPC ........ *G06F 16/2358* (2019.01); *G06F 16/213* (2019.01); *G06F 16/252* (2019.01)

(58) Field of Classification Search
  CPC ............................ G06F 16/2358; G06F 16/252
  See application file for complete search history.

(56) References Cited

U.S. PATENT DOCUMENTS

| | | | |
|---|---|---|---|
| 2018/0232741 A1* | 8/2018 | Jadhav | G06Q 30/016 |
| 2019/0236466 A1* | 8/2019 | Harrison | G06N 5/043 |
| 2021/0357372 A1* | 11/2021 | Fujimaki | G06F 16/2465 |
| 2022/0121992 A1 | 4/2022 | Scavo et al. | |
| 2024/0070009 A1* | 2/2024 | Schoenfeldt | G06F 11/0709 |

OTHER PUBLICATIONS

Mirza Golam Kibria et al., "Big Data Analytics, Machine Learning, and Artificial Intelligence in Next-Generation Wireless Networks," IEEE Access, Apr. 4, 2018, pp. 1-11. (Year: 2018).*
U.S. Appl. No. 18/508,695, Eberlein et al., Data Access Control for Domain Specific Large Language Model Services, filed Nov. 14, 2023, 38 pages.
Extended European Search Report in European Appln. No. 24206717.1, mailed on Mar. 14, 2025, 9 pages.

* cited by examiner

*Primary Examiner* — Cheryl Lewis
(74) *Attorney, Agent, or Firm* — Fish & Richardson P.C.

(57) ABSTRACT

Using a data analysis activity (DAA) definition, a DAA associated with a software application is triggered. An instance selector query is executed to generate a set of instance values as input for a data query. A data query to generate a data set is executed using instance values of the set of instance values. Using the data set, an instruction for an artificial intelligence (AI) engine is computed. A result based on the instruction for an AI engine is received from the AI engine. The result based on the instruction for an AI engine is stored into an AI Result History Store. Prior results from earlier DAA executions is read from the AI Result History Store. A notification to a defined target audience is sent using the software application.

20 Claims, 4 Drawing Sheets

ORGANIZATIONAL PROCESS BACKGROUND INTELLIGENCE

BACKGROUND

Software applications used by organizations (e.g., enterprise resource planning (ERP) or customer relation management (CRM)) use databases (DBs) with many tables, where the tables contain data for different organizational processes/software application domains. Modern software applications include a "digital assistant" implementing artificial intelligence (AI) technology, which is triggered upon a user action. A user has a conversation with the digital assistant, which executes desired tasks. Computations are performed on available data, desired data analysis is performed "ad-hoc" (e.g., triggered by the user directly using a graphical user interface (GUI)). The digital assistant might present intermediary results with options for the user to select from on how to proceed. Classical background activities (e.g., running as "batch job" at a planned date and time or time interval) process data and create a result stored in a DB for later consumption-usually without use of AI and without an intermediate user interaction.

Data intensive software applications possess analytics functionality, which allows users to run analysis, perform "signal hunting," and search for anomalies in the data, changes in trends, etc. Such an analysis is typically executed by a data scientist based on currently available data. A Data Scientist will write code snippets to execute the code sections on the data, provide an intermediary result, and a following code section will work on the intermediate result with an option for intervention by the user. When such an analysis is considered valuable, it is likely repeated semi-manually at some point. However, digital assistant supported activity currently does not run continuously in the background and notify a user only if a signal is found or continuously execute and assess results of intelligent signal hunting.

SUMMARY

The present disclosure describes organizational process background intelligence.

In an implementation, a computer-implemented method, comprising: triggering, using a data analysis activity (DAA) definition, a DAA associated with a software application; executing, by the DAA, an instance selector query to generate a set of instance values as input for a data query; executing, by the DAA and using instance values of the set of instance values, a data query to generate a data set; computing, by the DAA and using the data set, an instruction for an artificial intelligence (AI) engine; receiving, by the DAA and from the AI engine, a result based on the instruction for an AI engine; storing, by the DAA and into an AI Result History Store, the result based on the instruction for an AI engine; reading, by the DAA and from the AI Result History Store, prior results from earlier DAA executions; and sending, by the DAA and using the software application, a notification to a defined target audience.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the described approach provides a mechanism to easily create artificial intelligence (AI) background jobs in a flexible, yet standardized manner. A customer administrator can simply see options and decide what to configure to run regularly. Second, running AI background jobs can reduce "time to know insight" for a customer as well as cost to find the insight (e.g., currently, analysis is an occasional human run exercise). Third, the described approach allows adjustments for a customer to fit into customized needs, configure customized AI models to use, and even to define customized background AI jobs, based on a copy of a vendor job or as a customized definition.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
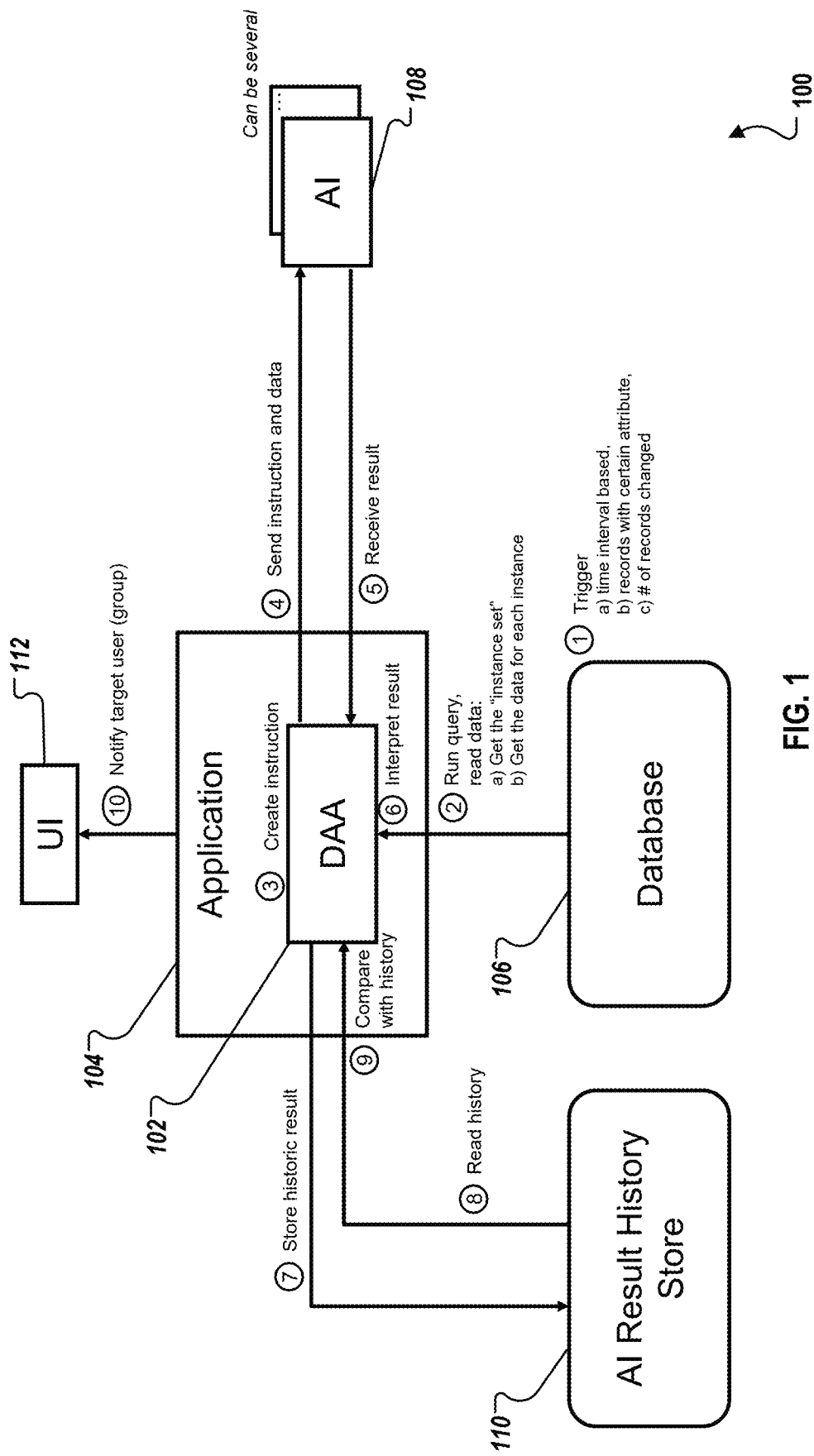
FIG. 1 is a block diagram illustrating an organizational process background intelligence component diagram with an associated process, according to an implementation of the present disclosure.

The following detailed description describes organizational process background intelligence and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and software applications (or applications), without departing from the scope of the present disclosure. In some implementations, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Software applications used by organizations (e.g., enterprise resource planning (ERP) or customer relation management (CRM)) use databases (DBs) with many tables, where the tables contain data for different organizational processes/software application domains. Modern software applications include a "digital assistant" implementing artificial intelligence (AI) technology, which is triggered upon a user action. A user has a conversation with the digital assistant, which executes desired tasks. Computations are performed on available data, desired data analysis is performed "ad-hoc" (e.g., triggered by the user directly using a graphical user interface (GUI)). The digital assistant might present intermediary results with options for the user to select from on how to proceed. Classical background activities (e.g., running as "batch job" at a planned date and time or time interval) process data and create a result stored in a DB for later consumption-usually without use of AI and without an intermediate user interaction.

Data intensive software applications possess analytics functionality, which allows users to run analysis, perform "signal hunting," and search for anomalies in the data, changes in trends, etc. Such an analysis is typically executed by a data scientist based on currently available data. A Data Scientist will write code snippets to execute the code sections on the data, provide an intermediary result, and a following code section will work on the intermediate result with an option for intervention by the user. When such an analysis is considered valuable, it is likely repeated semi-manually at some point.

A question is how a system can be designed to run a digital-assistant-supported activity continuously in the background and to notify the user if a signal is found. A similar question is how can intelligent "signal hunting" be executed continuously—and how to add calls to AI for the data analysis or to assess a found signal.

At a high-level, the described approach is a computer-implemented system to formulate questions to an AI for the analysis of software application data, permit the analysis to run continuously in the background calling one or several AIs. The system also permits designing, shipping, configuring, extending, and triggering execution of the analysis of software application data in the background. If the one or more AIs identify and assesses a signal in the software application data (e.g., an anomaly) and provides a response, which is forwarded as a notification to the user—the user can interactively continue the analysis process (with the same data set and context used by the AI to find the signal) with the AI. Signals can be assessed by the system using another AI (e.g., an organization-trained AI). In some implementations, a hyperlink (e.g., a uniform resource locator (URL)) can be provided with the notification to the user, which launches a data query and AI analysis process again, but gives the user the option to interactively continue the session with the AI, such as in the form of a chatbot.

Intelligent data analysis or signal hunting is based on user action on a data set available at this time. For an analysis of a data set that has been updated with new data, the analysis has to be repeated manually and the user needs to decide each time if the results of one specific analysis are sufficiently relevant to take action on any detected anomalies. Data analysis calling AI tools for signal hunting (i.e., running a sequence of analytics queries with human input between queries) is an activity triggered by a user. It is a rather conscious action that a user must think about and spend time executing. It would be advantageous to continuously watch relevant data for changes and perform AI analysis subconsciously, only reporting back to the user if something organizationally relevant is found.

Continuous data analysis is costly (e.g., hardware intensive) and not always necessary (e.g., on unchanged data). If data analysis is run recurringly for an unchanged data set, a result of the analysis will also be unchanged. As previously mentioned, data sets of software applications used by organizations are stored in many DB tables. The DB tables often have many key fields—a data analysis might be run for a set of combinations of tables and key field values (e.g., a dunning run for every customer, sales analysis for every customer and product segment). Data in the system can be changed by many users, such changes are typically distributed across several tables and table key field values. The data set thus changes heterogeneously. It is necessary to be able to identify the data analysis runs to be executed (and the set of data they should be run on) because the data being queried changed. Likewise, an ability is also needed to be able to identify which runs to skip, as the queried data did not change (at least significantly).

When identified changes in data sets have been reported to a user, subsequent runs of data analysis will likely find the same changes again and report again, flooding the user. Avoiding sending an identified insight to a user many times for each new run is important, as at some point a newly found signal in the data set is not "new" and notifications are not helpful.

In the described approach, an AI is allowed to run an analysis of software application data in the background and notify users when an interesting signal in the data is found (instead of hunting for the signal manually). Formulated on a software application level: Define a software-application-related question to the data and let the AI work in the background on answering the data—not only once, but continuously, and also for newly entered or changed data sets.

This can be accomplished by defining a data analysis activity (DAA) (e.g., by a vendor developer or a customer system administrator) and letting the analysis run in a background mode by the software application. The DAA is a set of data queries and instructions (i.e., a prompt) for how to call the AI (e.g., an AI engine) with the data. The DAA can then be activated in a customer system to process customer software application data. The execution of the DAA can be started using a configured recurring batch job, a DB trigger listening for certain change events, or a batch job scheduled upon a significant change in the data set (e.g., one hundred data records have been updated). When the DAA is executed, the DAA reads the data using the defined data queries, processes the data set to create a message to be sent to the AI (i.e., typically, a prompt with instructions, examples, and the read data set).

The DAA then receives the response of the AI, interprets the result, and executes a follow-up action. In some implementations, the follow-up action can be, for example:

Execute the next step of the data analysis activity (another query to retrieve more information, another call to the AI)—if any is defined, Generate a notification to the user-if the result is significant and the notification on a similar result has not been sent shortly before (i.e., querying an "AI response history"), Store the response of the AI in an "AI response history".

A DAA can be created by a Background Intelligence Engineer (BIE). This role can be taken by a developer of the software application vendor, a system administrator, or a developer for the software application consumer. The BIE specifies the DAA definition, for example:

The triggering mechanism (e.g., batch, trigger, and updates on relevant data set),
    The "instance selector query"—a query returning a result set, for each record in the result, the analysis is called.
    The data query statement,
    the prompt to the AI (e.g., instructions, examples),
    Code to process the data and response,
    A template for the response to be generated,
    Optional follow-up steps, if the analysis is run multi-step ("signal hunting style").

The DAA can be activated by a user of the application to continuously analyze Organizational data. During activation, the user can configure, which users, user groups or user roles to send a notification to, if a notification is generated. A BIE of a customer can adjust the DAA definition to match own needs, e.g., extend the data query statement by custom extension fields or modify the generated response.

A hyperlink included in a notification can be used to resume the analysis in interactive mode, for example:

An identifier of the DAA sending the notification is determined, also the "instance selector."
    The DAA execution is restarted:
        The data query for the "instance selector" is executed,
        The instruction to the AI is computed.
        The AI is called in a session which is accessible for the user,
        the instructions and the queried data are sent to the AI,
        the response of the AI is provided in the session and not processed by the DAA execution.
        The user continues with the session (e.g., in a chatbot-like user interface) and closes the session.

Optionally, the system can be designed to call different (i.e., specialized) AI engines in different steps. For example, send the data first to an AI specialized in data analysis and signal/anomaly detection-such an AI will typically be provided by a third-party provider. In a later step, when a data signal needs to be interpreted, a software-application-domain-specialized AI (e.g., ERP or supply chain) can be called. The specialized AI will typically be fine-tuned for the customer with company internal or confidential data of the customer.

Also optionally, the process can be varied. That is, the AI may read data by itself using a plug-in, instead of the DAA reading the data and sending it to an AI. In this case, the data query statement does not have to be defined by the BIE, but can be generated by the AI. The triggering mechanism (e.g., updates on a relevant data set) would rely on the AI specifying the query statement first. In some implementations, this could be performed by a separate call to the AI with a dedicated prompt, or by a test execution of the DAA and an infrastructure permitting retrieving the data access calls by the AI. With the data access calls, a check for the triggering mechanism can be created.

FIG. 1 is a block diagram 100 illustrating an organizational process background intelligence (OPBI) component diagram with an associated process 101, according to an implementation of the present disclosure.

A DAA 102 is a component embedded within an Application 104 (a software application) and is used to coordinate access to data from a Database 106. In some implementations, the DAA includes an identifier (ID); a use case description; a triggering mechanism (e.g., batch, trigger, or a change in volume of queries); an instance selector query (e.g., a query returning a result set, for each record in the result set, an analysis is called); a data query statement; an address of an AI to call (e.g., AI 108—of which there can be more than one available) and which can be third-party defined or by a system administrator; a prompt to the AI (e.g., instructions and examples); software code to process data, interpret a response from the AI, store a historic result (e.g., into an AI Result History Store 110 used to help prevent multiple notifications/overreporting sufficient changes have not occurred), and to compare the result with history; a notification template for the response from the AI to be generated; optional follow-up steps if an analysis is run as multi-step (i.e., signal hunting); and who (i.e., a defined target audience—e.g., user(s), user group(s), or role(s)) is to be informed (e.g., using a GUI, such as UI 112) when a significant result is detected.

For every DAA 102 associated with the Application 104, a system administrator needs to decide whether to activate the DAA 102 for a use case. To support decision making, a DAA activator (not illustrated) queries data to inform the system administrator, if a number of data sets is sufficient for the AI to operate efficiently. In some implementations, the DAA activator is a component associated with the Application 104.

In some implementations, the system administrator can specify/overwrite an address of the AI to call (e.g., in case it is a custom AI). Optionally, the AI can be called with the data set and result displayed.

In some implementations, information presented by the DAA activator to the system administrator for a use case activation can include:

Run a query to obtain an instance set of instance values, which is a number of data sets to analyze.
    Run a data query for a first instance (or all instances) resulting in an example data set as well as a number of data set rows.
    Show a use case description of the DAA 102 to the system administrator, including the number of data sets to analyze and the number of data set rows. Optionally, the system administrator can view the example data set.
    The system administrator can then make an educated decision whether to activate the DAA 102 for the use case.

The system administrator is asked to specify names/IDs of a defined target audience to be notified. Potentially, the defined target audience can depend on an instance-therefore different defined target audiences for different values can be defined in an instance selector query. A target audience definition is stored so it can be used when the DAA 102 is executed.

Upon DAA 102 activation, the DAA activator reads the DAA 102 definition, to determine how to trigger the execution of the DAA 102. In some implementations, the DAA activator can plan a batch job to execute the DAA 102 (e.g., run a data query, call the AI 108, store a result in the AI Result History Store 110, and to notify users). The DAA activator can also plan a batch job to identify updates on a relevant data set and to decide upon a threshold number of changed records or another metric which will result in executing the DAA 102. The DAA activator can also create a DB trigger, which triggers execution of the DAA 102.

In some implementations, the process 101 associated with organizational process background intelligence is:

At (1), the DAA 102 is triggered to execute by a scheduler or a DB trigger. From (1), process 101 proceeds to (2a).
    At (2a), the DAA 102 executes an instance selector query, resulting in generation of an instance set of instance values as input for a data query. For example, for a dunning run, names and IDs of customers can be returned. The DAA 102 loops all instance values. From (2a), process 101 proceeds to (2b) within the looping over all instance values.

At (2b), a data query is executed with the "instance values" (e.g., a customer name), resulting in generation of a data set (for this instance). From (2b), process 101 proceeds to (3).

At (3), The DAA 102 code takes the data set from (2b) and computes an instruction for the AI 108 (e.g., using a prompt definition, which is typically a template with instructions as to what to do and examples) and adds the data set. From (3), process 101 proceeds to (4).

At (4), a message is sent by the DAA 102 and to the AI 108 (i.e., as mentioned above, typically a prompt with instructions, examples, and the data set). From (4), process 101 proceeds to (5).

At (5), a response is received by the DAA 102 and from the AI 108. From (5), process 101 proceeds to (6).

At (6), the response received by DAA 102 and from the AI 108 is interpreted. From (6), process 101 proceeds to (7).

At (7), the AI result is stored by the DAA 102 and into an AI Result History Store 110. From (7), process 101 proceeds to (8).

At (8), prior results from earlier DAA 102 executions are read by the DAA 102 and from the AI Result History Store 110. From (8), process 101 proceeds to (9).

At (9), whether to notify a defined target audience is determined by the DAA 102. In some implementations, the determination is based upon: i) a result of AI 108 or ii) previously sent results from the AI 108. In some implementations, logic can be defined to prevent automatically re-sending a result that was previously sent). In some implementations, the logic can define thresholds or other criteria to permit limited re-sending of a result(s). Optionally, every nth occurrence can result in a sent summary message, such as a particular result "has been found n times in the last . . . hours"). If a determination is made at (9) to notify, a notification is generated using a template. From (9), process 101 proceeds to (10).

At (10), a notification is sent by the DAA 102 and using the Application 104 to a defined target audience. Optionally, aggregated information associated with DAA 102 executions for the instance can be summarized and sent as a notification to the defined target audience.

With respect to an organizational process background intelligence execution, a DAA 102 can be a defined sequence of steps to be executed. Each step can have a query, software code to process data, generate a call to AI, and perform a call to the AI, as well as software code to interpret a response from the AI. In some implementations, a further step can call a different AI. In some implementations, after an initial execution of DAA 102 executing previously described steps (1) to (10), a notification sent to the defined target audience can be configured by a system administrator to reflect customer needs and contain a response of the AI. In some implementations, a notification can also contain a hyperlink (e.g., a uniform resource locator (URL)) for the defined target audience to resume the execution of the DAA 102 execution in an interactive mode.

To resume an analysis, in some implementations, information can be embedded in the hyperlink, including: i) ID of the DAA 102 to resume; ii) an instance value of an instance selector query used to retrieve data which had been sent to the AI 108 and iii) the step ID to be resumed.

Upon the defined target audience requesting to resume the execution of the DAA 102: i) The DAA 102 of the specified ID is called. Instead of (1), the trigger is the request by the defined target audience started by following the hyperlink; ii) the query of data is executed with the desired instance value; iii) (2) is executed exactly for the value of the desired analysis; iv) (3) is executed and the instruction is computed; v) (4) is a modified call to the AI 108, the AI 108 is called in a session with a session context that is provided to the defined target audience; vi) (5) is modified: the response of the AI 108 is not sent to the DAA 102 but provided in the session; vii) the defined target audience can continue interactively with the AI 108 to specify further data analysis. Optionally, the desired target audience can continue with the AI 108 and the AI 108 can query information from the Application 104 interactively.

In an implementation, an example for use of organizational process background intelligence in the domain of intelligent sales support can include question to be answered, such as: 1) Are there products, which most customers of a certain segment purchased and 2) which customers of this segment did not purchase these products (unlike the majority). This could be an opportunity for a sales agent to contact the customers or to identify a reason these customers did not purchase the identified products and if the customers chose an alternative product.

For this example, the DAA 102 would be configured to execute two steps:

Step 1: i) an instance query would be: get list of customer segments; ii) for each customer segment, the list of customers in this segment is read; iii) the list of products is read, purchased by the customers in the segment; and iv) the analysis is: which products have been purchased by most customers.

Step 2: for the list of products which have been purchased by most customers, identify customers within the same segment that did not purchase these products. The identified customers in this segment are an exception as they did not purchase this product. The information is passed as a notification to the responsible sales agent.

The notification can containe a hyperlink (url) to continue the analysis in interactive mode, as the sales agent might have follow-up questions: i) does the customer purchase another product of the category or none at all?; ii) if the customer purchased another product, which product?; and iii) how do these products differ from the products purchased by the majority? An analysis continuing in another domain could be used to identify other reasons why a customer did not purchase, such as a financial issue or the customer had previously purchased a large amount and put them on stock.

Figure 2:
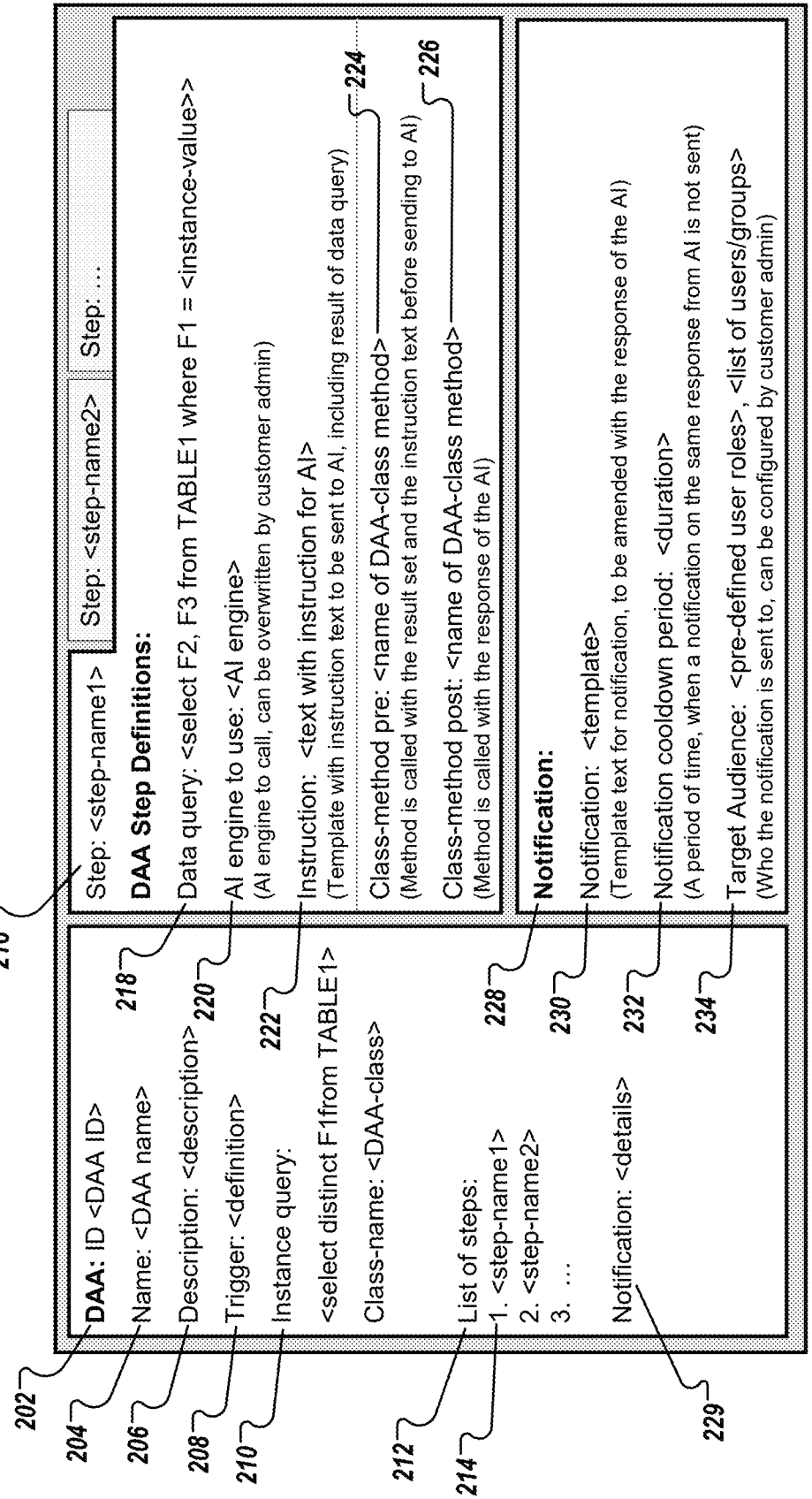
FIG. 2 is a mock-up of an example data analysis activity (DAA) editor, according to an implementation of the present disclosure.

FIG. 2 is a mock-up of an example DAA editor 200, according to an implementation of the present disclosure.

The DAA editor 200 permits a background intelligence engineer (BIE) to specify required data for a DAA (e.g., DAA 102 in FIG. 1). Potentially, a vendor can allow a customer to overwrite all values (except the ID), but a vendor also might want to restrict modifications to a DAA and limit to an address of AI to call, notification template, and target audience.

In some implementations, for a vendor view of the DAA editor 200:

The DAA editor 200 will show the DAA with information valid for the complete DAA. Information can include: i) ID 202 and Name 204; ii) Description 206: the customer administrator can then understand the case and it eases a determination whether to activate the DAA; ii) Trigger definition 208: used during activation to create a trigger or schedule a batch (e.g., batch, trigger, and change-volume of query); and iii) Instance query 210: a query as a structured query language (SQL) statement or application programming interface (API) call is used receive a set of values for to be specified in the data query, the data query is called for every value returned by the instance selector query.

In some implementations, the DAA editor 200 can also have:

A set (list) of steps 212 with step name 214.

The content for the steps can be defined using a dedicated screen (here a tab) 216.

The Data query 218 is for a data set which is (processed and) sent to a specified AI for analysis.

An AI engine 220 to call (in some implementations, the address of the AI engine is configured globally in the application and not specifically for this DAA step).

An Instruction 222 to be sent to the AI.

Class methods 224 and 226 (or, in some cases, functions or classes) to be called to process read data (pre) and response (post), respectively, of the AI response.

For Notifications 228 (and Notification summary 229):
1) Notification template 230: predefined text to be sent to the users, extended by the response of the AI. Customers typically want to adjust this to their own naming conventions, layouts, etc.
2) Notification cooldown period 232: specifies a delay in sending subsequent notifications (e.g., for the same event) in order to remove unnecessary notifications.
3) Target Audience 234: a defined target audience that a notification should be sent to. Customers can adjust the list of user(s), user group(s), or role(s) to be informed about results.

In some implementations, for a customer view, a customer can:
1) See a complete set of fields and values, but is limited to overwrite only a few values (e.g., AI engine to use 220, Notification template 230, and Target Audience 234),
2) A vendor can decide to offer functionality (not illustrated) to copy a DAA to a private DAA copy and to let a customer admin set values for the private DAA copy freely, or
3) Overwrite all DAA values.

Figure 3:
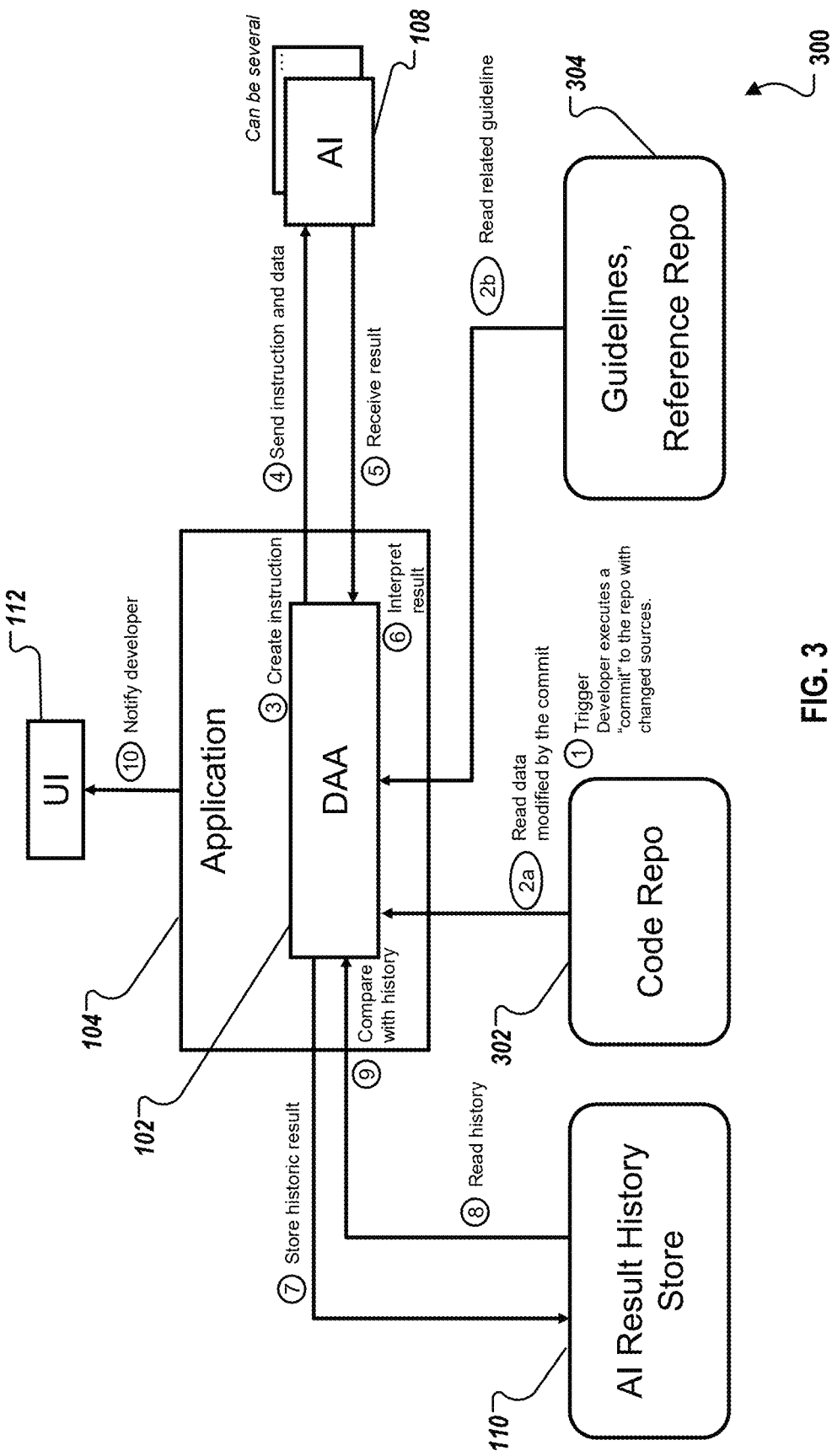
FIG. 3 is a block diagram illustrating a development process background intelligence component diagram with an associated process, according to an implementation of the present disclosure.

FIG. 3 is a block diagram 300 illustrating a development process background intelligence component diagram with an associated process 301, according to an implementation of the present disclosure.

A related scenario with an extended engine can be envisioned. For large software vendors, development guidelines are created to ensure a homogeneous appearance (e.g., of GUIs) to a user, homogeneous operations models, and consistent deployment and support. The development guidelines must be followed by development teams. It is typically hard to ensure all teams follow the development guidelines, which are updated from time-to-time.

Development guideline compliance is typically checked manually by architects, UI/GUI engineers, and other specialists. This is a cumbersome, time-consuming, and error-prone approach causing delay before software deployments (i.e., compliance has to be checked first) and adds to a cost of development. With the described approach, this process can be automated with a development process background intelligence (DPBI) enhancement.

The trigger event (1) is in this case a change to software code or configuration files of the application-such resources are typically stored in a Code Repo 302 (i.e., a code repository). For the purposes of this example, a trigger event for the DPBI is a DB "commit" or "branch merge" event in the Code Repo 302.

In a difference from process 101 of FIG. 1, instead of the data query (2), the changed source code documents (or the changed sections of these documents if they are too large) are retrieved at (2a) in process 301.

A mandatory extension to the OPBI is required to enable executing instead as a DPBI. For the extension, the AI 108 needs to be enabled to execute an architecture check, which can be envisioned in several ways/for several use cases:
1) A list of mandatory components is defined that the Application 104 must use to be compliant. The AI 108 then can check if the components are imported and used (e.g., a logging API, a container configuration, or a DB type). Checking use might require access to other code sources in the Code Repo 302 other than just those that were affected by the triggering change.
2) A document with guidelines. In the example of FIG. 3, this is a Guidelines, Reference Repo (GRR) 304 (guidelines, reference repository). Ideally, a relevant section in the GRR 304 is identified as related to the type or code or configuration file being modified in a first step. In a second step, the AI 108 is instructed specifically for the GRR 304 section and passed the relevant guideline (e.g., it is a deployment configuration or a UI source). Instructions can be optimized in this way.
3) A style guide, e.g., for UI 112, which library to use, which color palette, which font, which layout, etc. Ideally, the related GRR 304 for the changed artifact is identified in a first step. In a second step, the GRR 304 section is used together with the modified code in a second call to the AI 108.
4) A reference application. The process 301 could be extended to read files of the same type, etc. and give the AI 108 the "reference file" and the "file by the developer." The AI 108 can then compare the files and is instructed to assess if the files differ with respect to a certain topic (e.g., formatting style guide or commenting convention).

At (2b), the DAA 102 reads the related guideline. From (2b), process 301 proceeds to (3).

At (3), with the related guideline, the DAA 102 can generate the message sent to the AI 108, including the instruction, the reference guideline, and the modified code. From (3), process 301 proceeds to (4).

At (4), the message is sent to the AI 108. From (4), process 301 proceeds to (5).

At (5), the response of the AI is received (in some implementations, the AI has access to the Code Repo 302 to query further data). From (5), process 301 proceeds to (6).

At (6), the response is processed. From (6), process 301 proceeds to (7).

At (7), the result is stored in the history at (7). From (7), process 301 proceeds to (8).

At (8), the DAA 102 reads the history for this analysis. From (8), process 301 proceeds to (9).

Step (9) can be extended. In this scenario, it is interesting if an earlier commit to the same Code Repo 302 already showed a deviation from the GRR 304 or if the deviation is new. If the deviation is not new, a notification to the developer can be enriched with information, which can include which commit caused the violation (and that the new commit did not resolve it). From (9), process 301 proceeds to (10).

At (10), a notification in this case is sent to the developer having modified the code, and the defined target audience to notify can be extended (e.g., all developers active in the Code Repo 302 and a responsible manager). In a modern development process, the notification (and, in some implementations, additional information) is sent to a continuous integration/continuous deployment (CI/CD) pipeline and can be used to stop executing further CI/CD steps (especially to prevent deployment).

Figure 4:
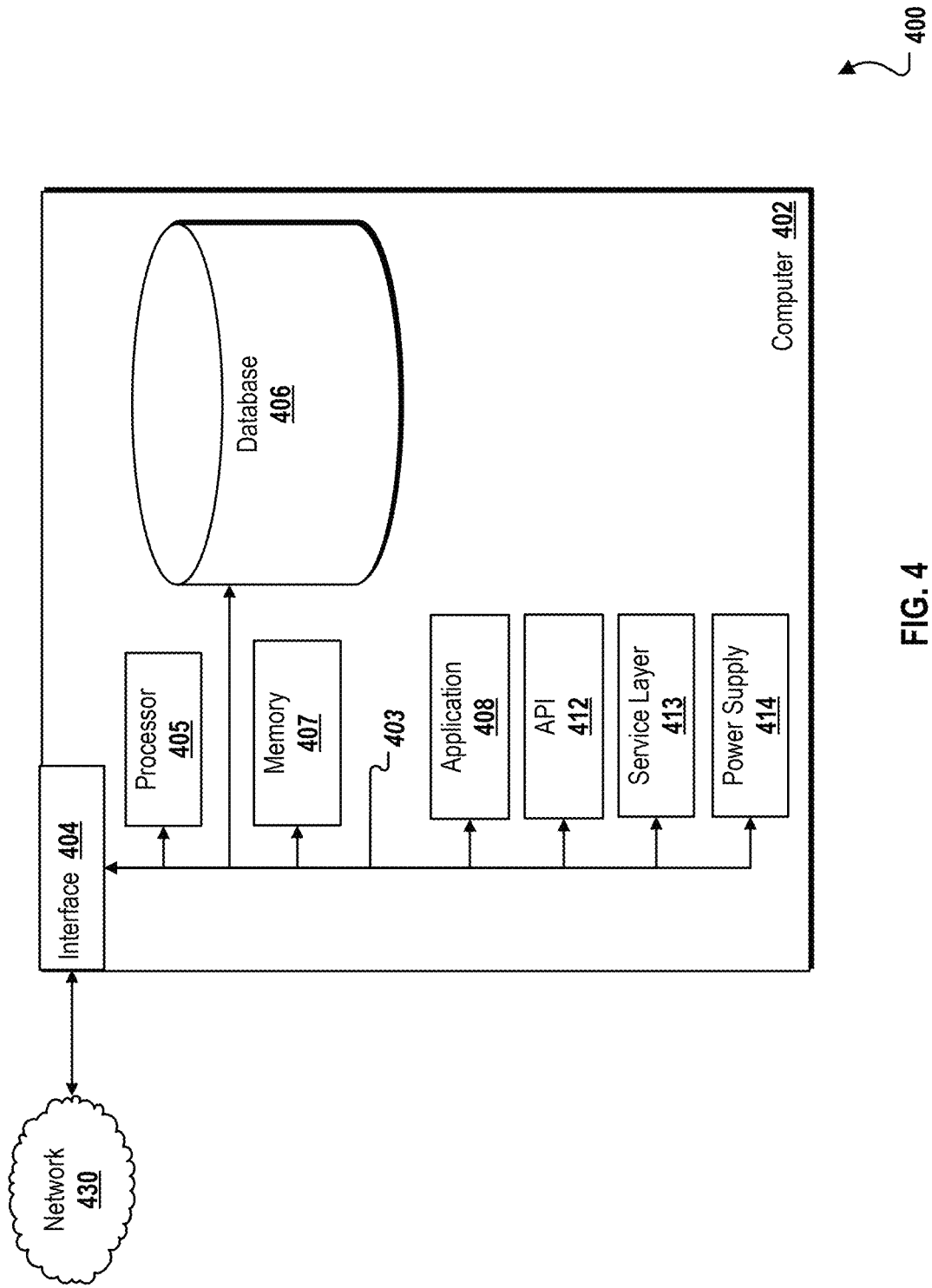
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, computer-implemented system 400 includes a Computer 402 and a Network 430.

The illustrated Computer 402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 402 can include an input device, such as a keypad, keyboard, or touch screen, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as, for example, a client, network component, a server, or a database or another persistency, or a combination of roles for performing the subject matter described in the present disclosure. The illustrated Computer 402 is communicably coupled with a Network 430. In some implementations, one or more components of the Computer 402 can be configured to operate within an environment, or a combination of environments, including cloud-computing, local, or global.

At a high level, the Computer 402 is an electronic computing device operable to receive, transmit, process, store, or manage data and information associated with the described subject matter. According to some implementations, the Computer 402 can also include or be communicably coupled with a server, such as an application server, e-mail server, web server, caching server, or streaming data server, or a combination of servers.

The Computer 402 can receive requests over Network 430 (e.g., from a client software application executing on another Computer 402) and respond to the received requests by processing the received requests using a software application or a combination of software applications. In addition, requests can also be sent to the Computer 402 from internal users (e.g., from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in a computing language (for example JAVA or C++) or a combination of computing languages, and providing data in a particular format (e.g., extensible markup language (XML)) or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory or conventional database storing data consistent with the present disclosure. In some implementations, Database 406 can be a combination of two or more different database types (e.g., a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. The Database 406 can hold and operate on at least any data type mentioned or any data type consistent with this disclosure.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (e.g., a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method, comprising: triggering, using a data analysis activity (DAA) definition, a DAA associated with a software application; executing, by the DAA, an instance selector query to generate a set of instance values as input for a data query; executing, by the DAA and using instance values of the set of instance values, a data query to generate a data set; computing, by the DAA and using the data set, an instruction for an artificial intelligence (AI) engine; receiving, by the DAA and from the AI engine, a result based on the instruction for an AI engine; storing, by the DAA and into an AI Result History Store, the result based on the instruction for an AI engine; reading, by the DAA and from the AI Result History Store, prior results from earlier DAA executions; and sending, by the DAA and using the software application, a notification to a defined target audience.

The foregoing and other described implementations can each, optionally, include one or more of the following features:

A first feature, combinable with any of the following features, wherein the DAA is triggered by a scheduler or a database trigger.

A second feature, combinable with any of the previous or following features, wherein the DAA loops over all instance values of the set of instance values.

A third feature, combinable with any of the previous or following features, wherein the instruction for an AI engine includes a prompt definition and the data set.

A fourth feature, combinable with any of the previous or following features, comprising, sending, by the DAA and to the AI engine, the instruction for an AI engine.

A fifth feature, combinable with any of the previous or following features, comprising interpreting, by the DAA, the result based on the instruction for the AI engine.

A sixth feature, combinable with any of the previous or following features, comprising determining, by the DAA, whether to notify the defined target audience, wherein the determination is based upon: i) a result of the AI engine or ii) previously sent results from the AI engine.

In a second implementation, a non-transitory, computer-readable medium storing one or more instructions executable by a computer system to perform one or more operations, comprising: triggering, using a data analysis activity (DAA) definition, a DAA associated with a software application; executing, by the DAA, an instance selector query to generate a set of instance values as input for a data query; executing, by the DAA and using instance values of the set of instance values, a data query to generate a data set; computing, by the DAA and using the data set, an instruction for an artificial intelligence (AI) engine; receiving, by the DAA and from the AI engine, a result based on the instruction for an AI engine; storing, by the DAA and into an AI Result History Store, the result based on the instruction for an AI engine; reading, by the DAA and from the AI Result History Store, prior results from earlier DAA executions; and sending, by the DAA and using the software application, a notification to a defined target audience.

The foregoing and other described implementations can each, optionally, include one or more of the following features:

A first feature, combinable with any of the following features, wherein the DAA is triggered by a scheduler or a database trigger.

A second feature, combinable with any of the previous or following features, wherein the DAA loops over all instance values of the set of instance values.

A third feature, combinable with any of the previous or following features, wherein the instruction for an AI engine includes a prompt definition and the data set.

A fourth feature, combinable with any of the previous or following features, comprising, sending, by the DAA and to the AI engine, the instruction for an AI engine.

A fifth feature, combinable with any of the previous or following features, comprising interpreting, by the DAA, the result based on the instruction for the AI engine.

A sixth feature, combinable with any of the previous or following features, comprising determining, by the DAA, whether to notify the defined target audience, wherein the determination is based upon: i) a result of the AI engine or ii) previously sent results from the AI engine.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations, comprising: triggering, using a data analysis activity (DAA) definition, a DAA associated with a software application; executing, by the DAA, an instance selector query to generate a set of instance values as input for a data query; executing, by the DAA and using instance values of the set of instance values, a data query to generate a data set; computing, by the DAA and using the data set, an instruction for an artificial intelligence (AI) engine; receiving, by the DAA and from the AI engine, a result based on the instruction for an AI engine; storing, by the DAA and into an AI Result History Store, the result based on the instruction for an AI engine; reading, by the DAA and from the AI Result History Store, prior results from earlier DAA executions; and sending, by the DAA and using the software application, a notification to a defined target audience.

The foregoing and other described implementations can each, optionally, include one or more of the following features:

A first feature, combinable with any of the following features, wherein the DAA is triggered by a scheduler or a database trigger.

A second feature, combinable with any of the previous or following features, wherein the DAA loops over all instance values of the set of instance values.

A third feature, combinable with any of the previous or following features, wherein the instruction for an AI engine includes a prompt definition and the data set.

A fourth feature, combinable with any of the previous or following features, comprising sending, by the DAA and to the AI engine, the instruction for an AI engine.

A fifth feature, combinable with any of the previous or following features, comprising interpreting, by the DAA, the result based on the instruction for the AI engine.

A sixth feature, combinable with any of the previous or following features, comprising determining, by the DAA, whether to notify the defined target audience, wherein the determination is based upon: i) a result of the AI engine or ii) previously sent results from the AI engine.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near (ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware—and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (e.g., by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   triggering, using a data analysis activity (DAA) definition, a DAA associated with a software application;
   executing, by the DAA, an instance selector query to generate a set of instance values as input for a data query, wherein a defined target audience depends on an instance of the set of instance values, and wherein different defined target audiences for different values are defined in the instance selector query;
   executing, by the DAA and using instance values of the set of instance values, a data query to generate a data set;
   computing, by the DAA and using the data set, an instruction for an artificial intelligence (AI) engine;
   receiving, by the DAA and from the AI engine, a result based on the instruction for an AI engine;
   storing, by the DAA and into an AI Result History Store, the result based on the instruction for an AI engine;
   reading, by the DAA and from the AI Result History Store, prior results from earlier DAA executions; and
   sending, by the DAA and using the software application, a notification to a defined target audience.

2. The computer-implemented method of claim 1, wherein the DAA is triggered by a scheduler or a database trigger.

3. The computer-implemented method of claim 1, wherein the DAA loops over all instance values of the set of instance values.

4. The computer-implemented method of claim 1, wherein the instruction for an AI engine includes a prompt definition and the data set.

5. The computer-implemented method of claim 4, comprising, sending, by the DAA and to the AI engine, the instruction for an AI engine.

6. The computer-implemented method of claim 1, comprising interpreting, by the DAA, the result based on the instruction for the AI engine.

7. The computer-implemented method of claim 1, comprising determining, by the DAA, whether to notify the defined target audience, wherein the determination is based upon: i) a result of the AI engine or ii) previously sent results from the AI engine.

8. A non-transitory, computer-readable medium storing one or more instructions executable by a computer system to perform one or more operations, comprising:
   triggering, using a data analysis activity (DAA) definition, a DAA associated with a software application;
   executing, by the DAA, an instance selector query to generate a set of instance values as input for a data query, wherein a defined target audience depends on an instance of the set of instance values, and wherein different defined target audiences for different values are defined in the instance selector query;
   executing, by the DAA and using instance values of the set of instance values, a data query to generate a data set;
   computing, by the DAA and using the data set, an instruction for an artificial intelligence (AI) engine;
   receiving, by the DAA and from the AI engine, a result based on the instruction for an AI engine;
   storing, by the DAA and into an AI Result History Store, the result based on the instruction for an AI engine;
   reading, by the DAA and from the AI Result History Store, prior results from earlier DAA executions; and
   sending, by the DAA and using the software application, a notification to a defined target audience.

9. The non-transitory, computer-readable medium of claim 8, wherein the DAA is triggered by a scheduler or a database trigger.

10. The non-transitory, computer-readable medium of claim 8, wherein the DAA loops over all instance values of the set of instance values.

11. The non-transitory, computer-readable medium of claim 8, wherein the instruction for an AI engine includes a prompt definition and the data set.

12. The non-transitory, computer-readable medium of claim 11, comprising, sending, by the DAA and to the AI engine, the instruction for an AI engine.

13. The non-transitory, computer-readable medium of claim 8, comprising interpreting, by the DAA, the result based on the instruction for the AI engine.

14. The non-transitory, computer-readable medium of claim 8, comprising determining, by the DAA, whether to notify the defined target audience, wherein the determination is based upon: i) a result of the AI engine or ii) previously sent results from the AI engine.

15. A computer-implemented system, comprising:
one or more computers; and
one or more computer memory devices interoperably coupled with the one or more computers and having tangible, non-transitory, machine-readable media storing one or more programmatic instructions that, when executed by the one or more computers, perform one or more operations, comprising:
triggering, using a data analysis activity (DAA) definition, a DAA associated with a software application;
executing, by the DAA, an instance selector query to generate a set of instance values as input for a data query, wherein a defined target audience depends on an instance of the set of instance values, and wherein different defined target audiences for different values are defined in the instance selector query;
executing, by the DAA and using instance values of the set of instance values, a data query to generate a data set;
computing, by the DAA and using the data set, an instruction for an artificial intelligence (AI) engine;
receiving, by the DAA and from the AI engine, a result based on the instruction for an AI engine;
storing, by the DAA and into an AI Result History Store, the result based on the instruction for an AI engine;
reading, by the DAA and from the AI Result History Store, prior results from earlier DAA executions; and
sending, by the DAA and using the software application, a notification to a defined target audience.

16. The computer-implemented system of claim 15, wherein the DAA is triggered by a scheduler or a database trigger.

17. The computer-implemented system of claim 15, wherein the DAA loops over all instance values of the set of instance values.

18. The computer-implemented system of claim 15, wherein the instruction for an AI engine includes a prompt definition and the data set.

19. The computer-implemented system of claim 18, comprising, sending, by the DAA and to the AI engine, the instruction for an AI engine.

20. The computer-implemented system of claim 15, comprising interpreting, by the DAA, the result based on the instruction for the AI engine.

* * * * *